(12) United States Patent
Distelhoff et al.

(10) Patent No.: US 6,591,866 B2
(45) Date of Patent: Jul. 15, 2003

(54) FUEL TANK

(75) Inventors: Markus Distelhoff, Griesheim (DE); Stefan Fühling, Dortmund (DE); Helmut Reischl, München (DE); Thomas Zapp, Dortmund (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/047,012

(22) Filed: Jan. 16, 2002

(65) Prior Publication Data

US 2002/0088439 A1 Jul. 11, 2002

Related U.S. Application Data

(63) Continuation of application No. PCT/EP00/06686, filed on Jul. 13, 2000.

(30) Foreign Application Priority Data

Jul. 16, 1999 (DE) .......................... 199 32 713

(51) Int. Cl.$^7$ ................................. F02M 33/08
(52) U.S. Cl. .................. 137/565.22; 123/516; 123/514
(58) Field of Search ................... 137/587, 565.22, 137/565.34; 123/514, 516, 518, 519, 522

(56) References Cited

U.S. PATENT DOCUMENTS

| | | | |
|---|---|---|---|
| 3,804,291 A | | 4/1974 | Fricker |
| 3,917,109 A | | 11/1975 | MacDonald |
| 4,279,232 A | * | 7/1981 | Schuster et al. ........ 123/514 X |
| 4,829,968 A | * | 5/1989 | Onufer ................. 123/520 |
| 4,852,761 A | * | 8/1989 | Turner et al. .......... 123/519 X |
| 4,860,715 A | * | 8/1989 | Hiraku et al. ........... 123/519 |
| 5,193,511 A | * | 3/1993 | Fujino ................. 123/516 X |
| 6,089,249 A | * | 7/2000 | Thibaut et al. ......... 137/587 X |
| 6,182,693 B1 | * | 2/2001 | Stack et al. ........... 123/519 X |

FOREIGN PATENT DOCUMENTS

| | | |
|---|---|---|
| DE | 30 40 160 A1 | 8/1982 |
| EP | 0 822 110 A2 | 2/1998 |
| EP | 0 921 026 A1 | 6/1999 |
| GB | 2 238 041 A | 5/1991 |

* cited by examiner

Primary Examiner—John Rivell
(74) Attorney, Agent, or Firm—Laurence A. Greenberg; Werner H. Stemer; Ralph E. Locher

(57) ABSTRACT

A fuel tank for a motor vehicle is described and has a collector tank disposed in its interior for extracting air from it. The collector tank is connected to a pressure-equalizing device that is disposed outside the fuel tank and has an activated carbon filter. Fuel penetrating into the collector tank is extracted by suction by a pump configured as a suction jet pump. As a result, the fuel tank has particularly low levels of fuel emission.

14 Claims, 1 Drawing Sheet

FUEL TANK

CROSS-REFERENCE TO RELATED APPLICATION

This application is a continuation of copending International Application No. PCT/EP00/06686, filed Jul. 13, 2000, which designated the United States.

BACKGROUND OF THE INVENTION

FIELD OF THE INVENTION

The invention relates to a fuel tank for a motor vehicle with a collector tank for extracting air from the fuel tank. The collector tank is connected to the interior of the fuel tank and to a pressure-equalizing device, in particular an activated carbon filter.

Such fuel tanks are often used in motor vehicles and are known from practice. The fuel tank usually has a total of two collector tanks for extracting air from it during refueling and during operation of the motor vehicle. The connection of the interior of the fuel tank and of the collector tank takes place via lines. By the collector tanks, the liquid fuel flowing in via the lines is separated from gaseous constituents and air. This prevents liquid fuel from passing into the pressure-equalizing device and damaging, in particular, the activated carbon filter.

The disadvantage with the known fuel tank is that, as a result of the large number of lines, it involves a high outlay to install and it has pronounced levels of fuel emission.

SUMMARY OF THE INVENTION

It is accordingly an object of the invention to provide a fuel tank which overcomes the above-mentioned disadvantages of the prior art devices of this general type, which results in particularly low levels of fuel emission and is as straightforward as possible to install.

With the foregoing and other objects in view there is provided, in accordance with the invention, a fuel tank for a motor vehicle. The fuel tank contains a fuel tank body having walls defining an interior, a pressure-equalizing device, a pump having a suction side, and a collector tank for extracting air from the fuel tank body. The collector tank is connected to the interior of the fuel tank body and to the pressure-equalizing device. More specifically, the collector tank is disposed within the fuel tank body and is connected to the suction side of the pump.

The problem is solved according to the invention in that the collector tank is disposed within the fuel tank or forms a subregion of the wall thereof.

By virtue of the configuration, the fuel tank according to the invention does not require any line between its interior and the collector tank since the collector tank is directly adjacent to the interior of the fuel tank and can thus simply be connected thereto. This results in the installation of the fuel tank according to the invention being simplified to a pronounced extent. Furthermore, the omission of the line having to be laid makes it possible to avoid the two connections of the line to the collector tank and the fuel tank. Since there are particularly high levels of fuel emission through the connections, the configuration of the fuel tank according to the invention results in the levels of fuel emission being vastly reduced. A further advantage of the configuration is that, in the event of the motor vehicle crashing, the risk of lines and tanks being wrenched away from the fuel tank is kept particularly low.

When the motor vehicle is cornering or is in an inclined position, it is possible for fuel to pass, via the collector tank, into the pressure-equalizing device and then into the surroundings. According to an advantageous development of the invention, however, fuel can be reliably retained within the fuel tank if a line leading to the pressure-equalizing device can be shut off by a changeover valve. Furthermore, the configuration prevents the activated carbon filter located in the pressure-equalizing device from being wetted with fuel and permanently damaged as a result.

It would be possible for the fuel tank according to the invention, like the known fuel tank, to have a collector tank in each case for extracting air during operation and for extracting air during refueling. The fuel tank according to the invention, however, is of particularly straightforward construction if the changeover valve is configured for alternating connection of the pressure-equalizing device to the collector tank or to the interior of the fuel tank. As a result, it is additionally possible for the fuel tank to be produced particularly cost-effectively.

Constant wetting of the changeover valve with fuel can easily be avoided, according to another advantageous development of the invention, if the changeover valve is disposed on the inside of the top wall of the fuel tank. This helps to reduce fuel emissions further.

It would be possible for the changeover valve to be actuated, for example, mechanically by a closure cover of a filler inlet of the fuel tank or a changeover flap that can be moved in the filler inlet by a fuel nozzle. However, according to another advantageous development of the invention, the changeover valve can be activated at any time, in dependence on traveling situations of the motor vehicle, if the changeover valve is a solenoid valve.

It helps to simply the installation of the fuel tank according to the invention further if the line leading to the pressure-equalizing device is routed through an installation cover of a fuel-delivery unit.

In particular in the case of fuel tanks with flat geometries, fuel can pass into the collector tank. With increasing internal pressure within the fuel tank, the fuel could be forced to the pressure-equalizing device. The situation where the fuel is led into the pressure-equalizing device can be reliably avoided, according to another advantageous development of the invention, if the collector tank is connected to the suction side of a pump. This makes it possible for fuel present in the collector tank to be extracted by suction.

It would be possible for the pump to be driven, for example, directly by an electrical device. According to another advantageous development, however, air and fuel can equally be delivered if the pump is a suction jet pump.

According to another advantageous development of the invention, the collector tank can easily separate liquid fuel from gaseous fuel and air if the collector tank has a funnel-shaped depression. In order to allow the liquid fuel to run off, the depression may have an opening.

Foaming and swirling of fuel present in the collector tank can easily be avoided, according to another advantageous development of the invention, if the pump is connected to the depression of the collector tank.

The pump may be disposed at any desired location in the fuel tank. The fuel tank according to the invention, however, requires a particularly low level of outlay as far as laying lines is concerned if the pump is disposed within the collector tank.

It would be possible for the suction jet pump to be supplied with fuel as the working fluid, for example, by a dedicated electrically operated pump. According to another advantageous development of the invention, however, the consumption of electrical energy for the pump can easily be avoided if, the pump, which is configured as a suction jet pump, is connected to a flow line or return line of an internal combustion engine. For this purpose, the suction jet pump may be connected to a flow line or a return line of the internal combustion engine of the motor vehicle.

Other features which are considered as characteristic for the invention are set forth in the appended claims.

Although the invention is illustrated and described herein as embodied in a fuel tank, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
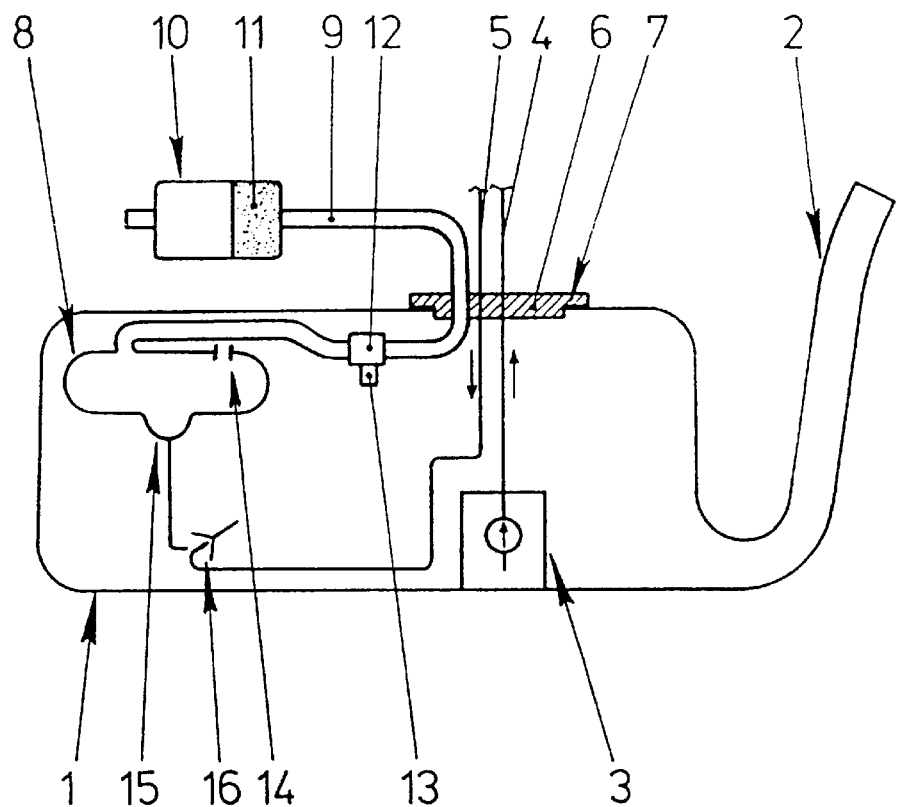
FIG. 1 a diagrammatic, longitudinal sectional view of a motor-vehicle fuel tank according to the invention.

In all the figures of the drawing, sub-features and integral parts that correspond to one another bear the same reference symbol in each case. Referring now to the figures of the drawing in detail and first, particularly, to FIG. 1 thereof, there is shown a fuel tank 1 with a filler inlet 2 for the introduction of fuel. Disposed in the fuel tank 1 is a fuel-delivery unit 3, which delivers the fuel, via a flow line 4, to a non-illustrated internal combustion engine of a motor vehicle. Excess fuel passes from the internal combustion engine, through a return line 5, back into the fuel tank 1. The fuel tank 1 has an installation opening 7 that is closed by an installation cover 6 and is intended for the fuel-delivery unit 3. The flow line 4 and the return line 5 are routed through the installation cover 6. A collector tank 8 is disposed within the fuel tank 1. The collector tank 8 is connected to a pressure-equalizing device 10 with an activated carbon filter 11 through a line 9 that is likewise routed through the installation cover 6. It is possible for the line 9 to be shut off by an electromagnetically switchable changeover valve 12 and for the pressure-equalizing device 10 to be connected to a connector 13 opening out directly into the fuel tank 1. The collector tank 8 additionally has an opening 14 for connecting to an interior of the fuel tank 1. During operation of the internal combustion engine, the changeover valve 12 connects the collector tank 8 to the pressure-equalizing device 10, while, during refueling of the fuel tank 1, the changeover valve 12 connects the connector 13, which opens out into the interior, to the pressure-equalizing device 10. FIG. 1 also shows that the collector tank 8 has a funnel-shaped depression 15. The funnel-shaped depression 15 is connected to a suction side of a pump 16, which is configured as a suction jet pump 16. The return line leads fuel as the working fluid to the pump 16. The pump 16 ensures that fuel present in the funnel-shaped depression 15 of the collector tank 8 is extracted by suction.

Figure 2:
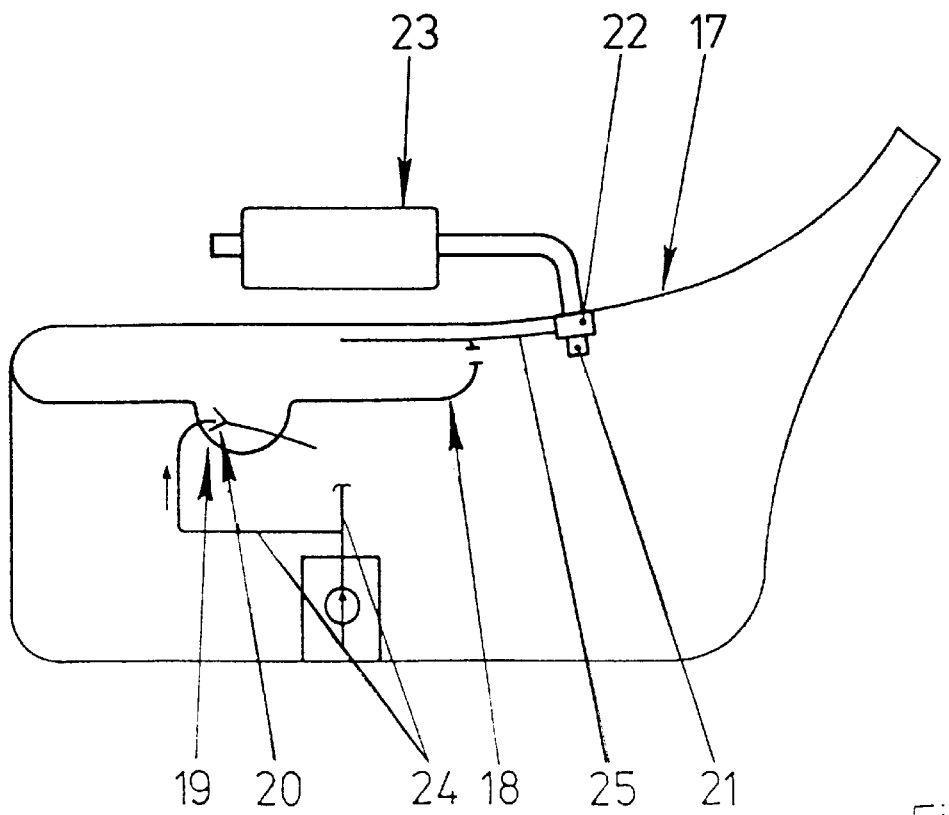
FIG. 2 is a sectional view of a second embodiment of the fuel tank according to the invention.

FIG. 2 shows a second embodiment of the invention which involves a fuel tank 17 with a collector tank 18 produced integrally with its wall. The collector tank 18 has a funnel-shaped depression 19 for collecting penetrating fuel and for accommodating a pump 20 configured as a suction jet pump 20. A changeover valve 22, which is connected to the collector tank 18 and a connector 21 opening out directly into the fuel tank 17, is disposed on the inside of the fuel tank 17. A line 25, which connects the collector tank 18 to the changeover valve 22, is likewise produced integrally with the wall of the fuel tank 17. The changeover valve 22 optionally produces a connection of the collector tank 18 or of the connector 21 to a pressure-equalizing device 23 disposed outside the fuel tank 17. The pump 20, which is configured as the suction jet pump 20, is supplied with fuel as the working fluid by way of a branched portion of a flow line 24. The pump 20 and the changeover valve 22 function as has been described in relation to FIG. 1.

We claim:

1. A fuel tank for a motor vehicle, comprising:
   a fuel tank body having walls defining an interior;
   a pressure-equalizing device;
   a pump having a suction side; and
   a collector tank for extracting air from said fuel tank body, said collector tank connected to said interior of said fuel tank body and to said pressure-equalizing device, said collector tank disposed within said fuel tank body and connected to said suction side of said pump.

2. The fuel tank according to claim 1, including:
   a line connected between said pressure-equalizing device and said collector tank; and
   a changeover valve disposed in said line for shutting off said line.

3. The fuel tank according to claim 2, wherein said changeover valve is configured for alternating a connection of said pressure-equalizing device to said collector tank or to said interior of said fuel tank body.

4. The fuel tank according to claim 2, wherein said walls include a top wall, and said changeover valve is disposed on an inside of said top wall of said fuel tank body.

5. The fuel tank according to claim 2, wherein said changeover valve is a solenoid valve.

6. The fuel tank according to claim 2, including an installation cover of a fuel delivery unit, said installation cover disposed in at least one wall of said fuel tank body and said line leading to said pressure-equalizing device is routed through said installation cover.

7. The fuel tank according to claim 1, wherein said pump is a suction jet pump.

8. The fuel tank according to claim 1, wherein said collector tank has a funnel-shaped depression.

9. The fuel tank according to claim 8, wherein said pump is connected to said funnel-shaped depression of said collector tank.

10. The fuel tank according to claim 1, wherein said pump is disposed within said collector tank.

11. The fuel tank according to claim 1,
    including a fuel line selected from the group consisting of a fuel flow line of an internal combustion engine and a fuel return line of the internal combustion engine; and
    wherein said pump is a suction jet pump connected to said fuel line for receiving fuel functioning as a working fluid.

12. The fuel tank according to claim 1, wherein said pressure-equalizing device has an activated carbon filter.

13. The fuel tank according to claim 1, wherein said collector tank forms a subregion of at least one of said walls of said fuel tank body.

14. The fuel tank according to claim 1, wherein at least one of said walls of said fuel tank body forms a subregion of said collector tank.

* * * * *

UNITED STATES PATENT AND TRADEMARK OFFICE
CERTIFICATE OF CORRECTION

PATENT NO. : 6,591,866 B2
DATED : July 15, 2003
INVENTOR(S) : Markus Distelhoff et al.

It is certified that error appears in the above-identified patent and that said Letters Patent is hereby corrected as shown below:

<u>Title page,</u>
Item [73], should read:
-- [73] Assignee: Siemens Aktiengesellschaft, Munich (DE), Bayerische Motoren Werke Aktiengesellschaft, Munich (DE) --

Signed and Sealed this

Twentieth Day of April, 2004

JON W. DUDAS
*Acting Director of the United States Patent and Trademark Office*